United States Patent
Takano et al.

(10) Patent No.: US 7,028,767 B2
(45) Date of Patent: Apr. 18, 2006

(54) VEHICLE AIR CONDITIONER WITH HOT-GAS HEATER CYCLE

(75) Inventors: Yoshiaki Takano, Kosai (JP); Toshitaka Shimizu, Nishio (JP)

(73) Assignee: Denso Corporation, Kariya (JP)

( * ) Notice: Subject to any disclaimer, the term of this patent is extended or adjusted under 35 U.S.C. 154(b) by 153 days.

(21) Appl. No.: 10/288,019

(22) Filed: Nov. 5, 2002

(65) Prior Publication Data

US 2003/0089493 A1    May 15, 2003

(30) Foreign Application Priority Data

Nov. 12, 2001 (JP) .............................. 2001-346197

(51) Int. Cl.
  F25B 1/00    (2006.01)
  F25B 29/00   (2006.01)
  B60H 1/22    (2006.01)
  B60H 1/03    (2006.01)
  B60H 1/32    (2006.01)

(52) U.S. Cl. .......................... 165/202; 165/42; 165/43; 165/240; 165/238.6; 165/238.7; 62/196.4; 62/503; 62/513; 237/2 B

(58) Field of Classification Search ................. 62/503, 62/513, 196.4, 238.6, 238.7; 165/202, 240, 165/42, 43; 237/2 B
See application file for complete search history.

(56) References Cited

U.S. PATENT DOCUMENTS

| | | | | |
|---|---|---|---|---|
| 3,651,657 A | * | 3/1972 | Bottum | 62/196.3 |
| 3,754,409 A | * | 8/1973 | Wreen et al. | 62/503 |
| 3,766,748 A | * | 10/1973 | Bottum et al. | 62/243 |
| 4,765,149 A | * | 8/1988 | Shiga et al. | 62/174 |
| 5,233,842 A | * | 8/1993 | Manning et al. | 62/132 |
| 5,291,941 A | * | 3/1994 | Enomoto et al. | 165/62 |
| 5,845,502 A | * | 12/1998 | Chen et al. | 62/81 |
| 6,023,935 A | * | 2/2000 | Okazaki et al. | 62/119 |
| 6,192,695 B1 | * | 2/2001 | Hirota | 62/196.4 |
| 6,449,980 B1 | * | 9/2002 | Minister | 62/513 |
| 6,604,576 B1 | * | 8/2003 | Noda et al. | 165/202 |

FOREIGN PATENT DOCUMENTS

| | | | | |
|---|---|---|---|---|
| JP | 02213666 A | * | 8/1990 | |
| JP | 02298770 A | * | 12/1990 | |
| JP | 04222360 A | * | 8/1992 | |
| JP | 08210720 A | * | 8/1996 | |
| JP | 09113039 A | * | 5/1997 | |
| JP | 11-042934 | | 2/1999 | |
| JP | 11042934 A | * | 2/1999 | |

* cited by examiner

Primary Examiner—John K. Ford
(74) Attorney, Agent, or Firm—Harness, Dickey & Pierce, PLC

(57) ABSTRACT

A vehicle air conditioner selectively switches one of a cooling mode in which an interior heat exchanger of a refrigerant cycle is operated as an evaporator for cooling air, and a heating mode in which the interior heat exchanger is operated as a radiator for heating air. In the vehicle air conditioner, an accumulator, for separating gas refrigerant and liquid refrigerant from each other and for storing the separated liquid refrigerant therein, is disposed between an outlet of the interior heat exchanger and a suction port of a compressor. Further, the accumulator includes a heating device for heating the liquid refrigerant stored in the accumulator in the heating mode. Therefore, heating performance for heating air in heating mode can be efficiently improved.

4 Claims, 13 Drawing Sheets

VEHICLE AIR CONDITIONER WITH HOT-GAS HEATER CYCLE

CROSS-REFERENCE TO RELATED APPLICATION

This application is related to and claims priority from Japanese Patent Application No. 2001-346197 filed on Nov. 12, 2001, the content of which is hereby incorporated by reference.

BACKGROUND OF THE INVENTION

1. Field of the Invention

The present invention relates to a vehicle air conditioner with a hot-gas heater cycle in which an interior heat exchanger is operated as a radiator by introducing hot gas refrigerant from a compressor directly into the interior heat exchanger. More particularly, the present invention relates to an accumulator having a heating device for heating refrigerant in the accumulator of the hot-gas heater cycle of the vehicle air conditioner.

2. Description of Related Art

A conventional vehicle air conditioner, disclosed in JP-A-11-42934, performs heating operation using a hot-gas heater cycle in a refrigerant cycle system. In this conventional vehicle air conditioner, when a temperature of cooling water (hot water) from the vehicle engine to a heater core is lower than a predetermined temperature, for example, when operation of the vehicle engine is started, gas refrigerant discharged from a compressor is introduced directly into an interior heat exchanger while bypassing a condenser. In this case, heat is radiated from gas refrigerant to air in the interior heat exchanger, so that auxiliary heating function can be obtained from the interior heat exchanger. That is, in this conventional vehicle air conditioner, a single interior heat exchanger disposed in an air conditioning case is selectively operated as an evaporator in a cooling mode and as a radiator in a heating mode. Further, a heating device such as an electric heater is provided on a low-pressure refrigerant pipe for connecting the interior heat exchanger and a suction side of the compressor. Then, heating performance in the heating mode is improved by heating refrigerant in the low-pressure refrigerant pipe using the heating device. Specifically, pressure of refrigerant to be sucked into the compressor is increased by the heated low-pressure refrigerant, and a mass density of refrigerant to be sucked into the compressor is increased. Therefore, a flow amount of refrigerant is increased, and a compression work amount of the compressor is increased.

In the hot-gas heater cycle, an accumulator, for separating refrigerant into liquid refrigerant and gas refrigerant and for storing the liquid refrigerant therein, is provided in the low-pressure refrigerant pipe. Therefore, gas refrigerant balances with liquid refrigerant in the accumulator, so that low-pressure refrigerant becomes saturation gas refrigerant at an outlet of the interior heat exchanger. Thus, the heating device heats only the saturation gas refrigerant in the low-pressure refrigerant pipe. However, since a heat transmission rate of gas refrigerant is much smaller than that of liquid refrigerant, a heat transmission amount from the heating device to refrigerant is necessarily reduced. Accordingly, heating performance cannot be sufficiently improved in the heating mode.

SUMMARY OF THE INVENTION

In view of the above problem, it is an object of the present invention to effectively improve heating performance in a hot-gas heating mode of a vehicle air conditioner.

It is an another object of the present invention to provide an improved water-proof structure of an electric heater used for improving the heating performance in the hot-gas heating mode.

According to the present invention, in a vehicle air conditioner where an interior heat exchanger disposed in an air conditioning case is used as an evaporator in a cooling mode and is used as a radiator in a heating mode, an accumulator for separating refrigerant into gas refrigerant and liquid refrigerant and for storing the separated liquid refrigerant therein, is disposed between an outlet of the interior heat exchanger and a suction port of a compressor. Further, the accumulator includes a heating device for heating the liquid refrigerant stored in the accumulator. Accordingly, in the heating mode, the liquid refrigerant stored in the accumulator can be heated by the heating device. Here, since a heat transmission rate of liquid refrigerant is greatly larger than that of gas refrigerant, heat generated by the heating device can be efficiently transmitted to refrigerant in the accumulator. Therefore, the liquid refrigerant in the accumulator is evaporated due to the transmitted heat from the heating device, and the pressure of refrigerant to be sucked into the compressor is increased. Therefore, the density of refrigerant to be sucked into the compressor is increased, the flow amount of refrigerant discharged from the compressor is increased, and pressure of refrigerant discharged from the compressor is increased. Thus, a compression-work amount of the compressor is increased. As a result, a radiation amount of the interior heat exchanger can be effectively increased, and heating performance for heating air to be blown into a passenger compartment can be effectively improved in the heating mode.

Preferably, the heating device is a hot water pipe into which hot water from the engine is circulated. In this case, the hot water pipe is disposed to heat an outer peripheral surface of the accumulator at a position where the liquid refrigerant is stored. Alternatively, the heating device is an electric heater. In this case, the electric heater includes a heater body having a thin plate shape covered with a film member, and the heater body has an electrical resistance material. Accordingly, it can prevent water from being introduced into the heater body of the electric heater, thereby improving water-proof performance of the electric heater.

Preferably, a pressure detection device is disposed for detecting the pressure of refrigerant at a high-pressure side of the hot-gas heater cycle in the heating mode, a heater control unit controls an operation state of the electric heater based on the pressure detected by the pressure detection device so that the pressure of refrigerant at the high-pressure side becomes higher than a predetermined pressure. Accordingly, the heating capacity can be accurately improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
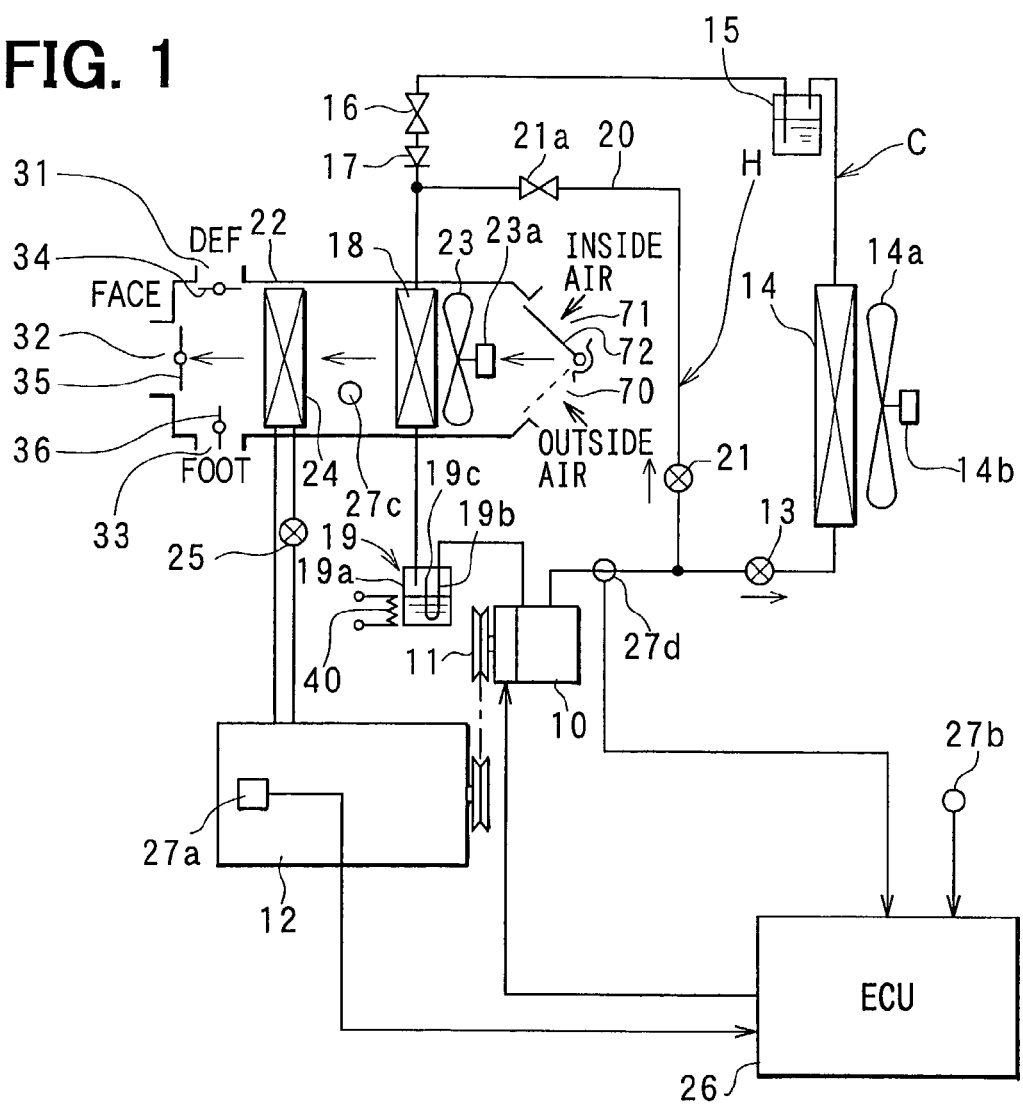
FIG. 1 is a schematic diagram showing an entire system of a vehicle air conditioner according to a first embodiment of the present invention.

A vehicle air conditioner according to the first embodiment is shown in FIG. 1. A compressor 10 is driven by a water-cooled vehicle engine 12 through a solenoid clutch 11, and is constructed by a fixed-capacity swash-plate compressor, for example. A discharge port of the compressor 10 is connected to a condenser 14 through a cooling solenoid valve 13, and an outlet of the condenser 14 is connected to a receiver 15 for separating refrigerant into gas refrigerant and liquid refrigerant and for storing therein the separated liquid refrigerant. The condenser 14 is disposed in an engine compartment together with the compressor 10 and the like, and is an exterior heat exchanger where refrigerant is heat-exchanged with outside air blown by an electric cooling fan 14a. The electric cooling fan 14a is driven by a fan motor 14b. An outlet of the receiver 15 is connected to a thermal expansion valve 16 constructing a cooling decompression device, and an outlet of the thermal expansion valve 16 is connected to an inlet of an evaporator 18 through a check valve 17. An outlet of the evaporator 18 is connected to a suction port of the compressor 10 through an accumulator 19. As described above, a cooling refrigerant cycle C is constructed by a closed circuit from the discharge port of the compressor 10 to the suction port of the compressor 10, through the cooling solenoid valve 13, the condenser 14, the receiver 15, the thermal expansion valve 16, the check valve 17, the evaporator 18 and the accumulator 19.

The thermal expansion valve 16 adjusts a flow amount of refrigerant by adjusting a valve open degree, so that a super-heating degree of refrigerant at the outlet of the evaporator 18 is maintained at a predetermined value in a cooling mode. The accumulator 19 includes a cylindrical tank body 19a in which refrigerant is separated into gas refrigerant and liquid refrigerant and the separated liquid refrigerant is stored therein. Further, the accumulator 19 includes a U-shaped refrigerant outlet pipe 19b having an upper end opening 19c in the tank body 19a. Therefore, gas refrigerant in the tank body 19a can be sucked into the suction port of the compressor 10. The refrigerant outlet pipe 19b includes an oil-return hole (not shown) at its bottom, so that a small amount of liquid refrigerant containing lubricating oil can be sucked from the tank body 19a around its bottom. Then, the liquid refrigerant is mixed with gas refrigerant, and the mixed refrigerant is introduced from the refrigerant outlet pipe 19b to the compressor 10. A hot-gas bypass passage 20, through which hot gas refrigerant from the compressor 10 bypasses the condenser 14 and the like, is provided between the discharge port of the compressor 10 and the inlet of the evaporator 18. A heating solenoid valve 21 and a throttle 21a are provided in series in the hot-gas bypass passage 20. The throttle 21a constructs a heating decompression device, and can be constructed by a fixed throttle such as an orifice and a capillary. A hot gas heating cycle H is constructed by a closed circuit from the discharge port of the compressor 10 to the suction port of the compressor 10 through the heating solenoid valve 21, the throttle 21a, the evaporator 18 and the accumulator 19.

An air conditioning case 22 of the vehicle air conditioner defines an air passage through which air blown by an air conditioning blower 23 flows into a passenger compartment. The air conditioning blower 23 is shown as an axial flow fan in FIG. 1 for simplifying the drawing. However, actually, the air conditioning blower 23 is a centrifugal blower including a centrifugal fan. The air conditioning blower 23 is driven and rotated by an electric blower motor 23a controlled by a blower driving circuit. An air blowing amount from the blower 23 can be changed continuously or in stepwise by adjusting a blower control voltage applied to the blower motor 23a. An outside air suction port 70, an inside air suction port 71 and a plate-shaped inside-outside air switching door 72 are provided at an air suction side of the air conditioning blower 23. The outside air suction port 70 is for sucking outside air outside the passenger compartment, and the inside air suction port 71 is for sucking inside air inside the passenger compartment. The switching door 72 is driven by an actuator such as a servomotor through a link mechanism (not shown), to switch one of an outside air suction mode and an inside air suction mode, for example. Outside air is sucked from the outside air suction port 70 in the outside air suction mode, and inside air is sucked from the inside air suction port 71 in the inside air suction mode, for example.

The evaporator 18 is an interior heat exchanger provided in the air conditioning case 22. In the cooling mode, refrigerant is circulated in the cooling refrigerant cycle C, and is evaporated in the evaporator 18 by absorbing heat from air, so that air passing through the evaporator is cooled. In the heating mode, high-temperature gas refrigerant (hot gas) from the compressor 10 flows into the evaporator 18 through the hot-gas bypass passage 20, so that air passing through the evaporator 18 is heated by the high-temperature gas refrigerant. That is, the evaporator 18 is operated as a cooler in the cooling mode and as a radiator in the heating mode. A hot-water heating heat exchanger 24 is disposed in the air conditioning case 22 at a downstream air side of the evaporator 18, for heating blown air using hot water (engine cooling water) from the vehicle engine 12 as a heat source. A hot water valve 25 is provided in a hot water circuit, for adjusting a flow amount of hot water flowing into the heating heat exchanger 24. Here, the heating heat exchanger 24 is used as a main heating unit for heating the passenger compartment, and the evaporator 18 is used as an auxiliary heating unit when being operated as a radiator in the hot-gas heater cycle H.

A defroster (DEF) air port 31, a face air port 32 and a foot air port 33 are provided at the most downstream air side in the air conditioning case 22. Conditioned air (mainly warm air) is blown to an inner surface of a windshield from the DEF air port 31. Conditioned air (mainly cool air) is blown toward the upper half body of a passenger from the face air port 32, and conditioned air (mainly warm air) is blown toward the foot portion (lower half body) of the passenger from the foot air port 33. Mode switching doors 34–36 are rotatably provided to selectively open and close the air ports 31–33, respectively. The mode switching doors 34–36 are driven by an actuator such as a servomotor through a link mechanism (not shown). An air-conditioning control unit (ECU) 26 is constructed by a microcomputer and its peripheral circuit. The ECU 26 performs predetermined processing in accordance with a beforehand set program, and controls operation states of the solenoid valves 13, 21 and operation states of other electric apparatuses 11, 14*a*, 23, 25, 40 and the likes.

Figure 2:
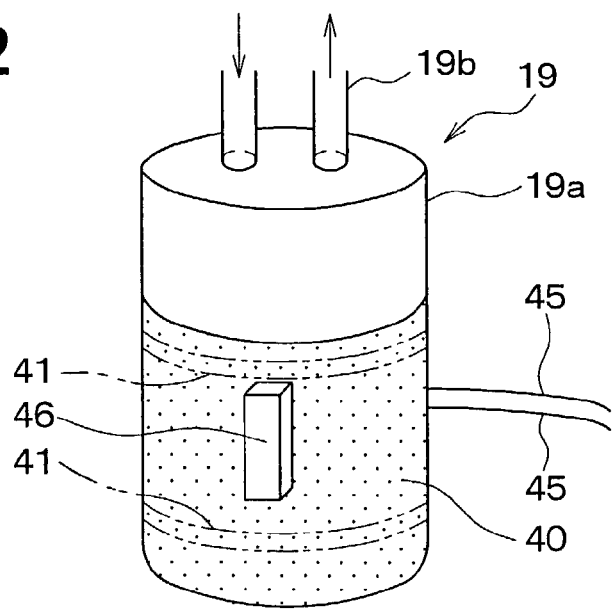
FIG. 2 is a perspective view showing an attachment structure of an electric heater to an accumulator in the vehicle air conditioner according to the first embodiment.
Figure 3:
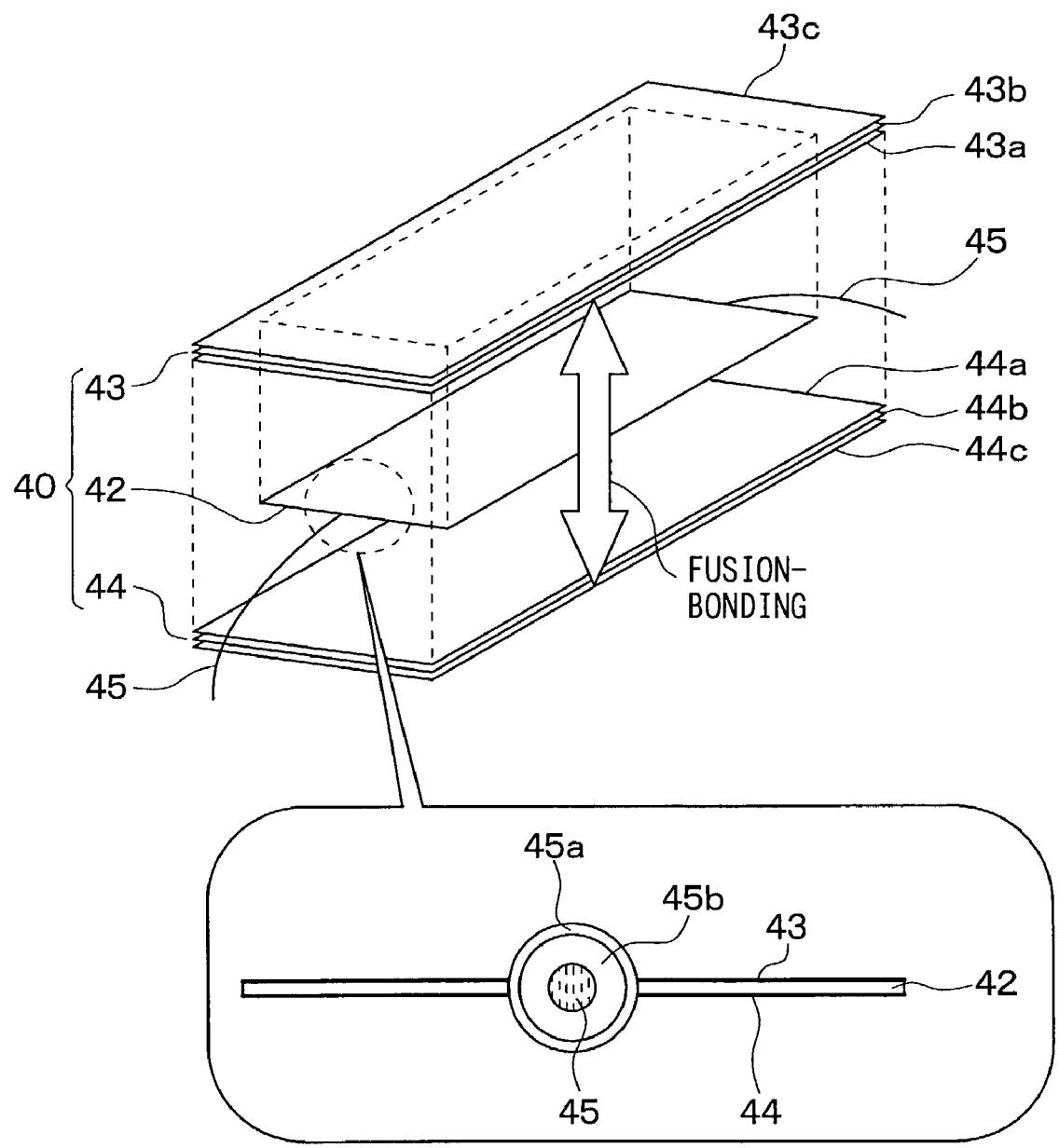
FIG. 3 is an exploded perspective view showing a structure of the electric heater in the vehicle air conditioner according to the first embodiment.

The accumulator 19 includes an electric heater 40 for heating liquid refrigerant in the accumulator 19. The electric heater 40 is provided for improving heating performance in the hot-gas heating mode. Specifically, as shown in FIG. 2, the electric heater 40 is fixed to an outer peripheral surface of the cylindrical tank body 19*a* at its lower portion. More specifically, as shown in FIG. 3, a thin-plate heater body 42 is sandwiched between multi-layer film members 43, 44 to integrally form the electric heater 40. Plural flexible electric resistors, each having an elongated thin-plate shape, are covered with an elastic member such as silicone rubber to form the heater body 42. The plural electric resistors are disposed in parallel to be electrically connected to each other. The electric resistors are insulated from each other by the silicone rubber, and are fixed by the silicone rubber.

The multi-layer film members 43, 44 have the same structure where three kinds of film members are stacked. Inside film layers 43*a*, 44*a* are made of resin such as polyethylene which has a lower melting point and can be used in bonding, due to thermal fusion. Since the electric heater 40 is controlled at 150° C., the resin material of the inside film layers 43*a* 44*a* is selected to have a melting point higher than 150° C. For example, polyethylene has a melting point of 200° C. Intermediate film layers 43*b*, 44*b* are made of metal foil such as aluminum foil, and prevent a water from passing through the multi-layer film members 43, 44 so that water resistance of the electric heater 40 can be improved. Outside film layers 43*c*, 44*c* are constructed for improving heat resistance of the electric heater 40, and are made of resin such as polyethylene terephtalate (PET) having excellent heat resistance.

The thin-plate heater body 42 is interposed between the multi-layer film members 43, 44, and the stacked body of the heater body 42 and the multi-layer film members 43, 44 is heated while being compressed. Thus, the resin of the inside films layer 43*a*, 44*a* has bonding action, and the heater body 42 is integrated with the multi-layer film members 43, 44 due to thermal fusion of the inside film layers 43*a*, 44*a*. Since the integrated electric heater 40 is a flexible thin plate, the electric heater 40 can be readily bent along the outer peripheral surface of the cylindrical tank body 19*a* to be attached to the outer peripheral surface of the tank body 19*a*, as shown in FIG. 2. Then, a ring band 41 is fitted and attached to an outer peripheral surface of the electric heater 40, and is fastened around that by screwing and the like, thereby fastening and fixing the electric heater 40 onto the outer peripheral surface of the tank body 19*a* of the accumulator 19.

A lead wire 45 and the heater body 42 are electrically connected to each other at a root portion of the lead wire 45. At the root portion, an adhesive 45*b* is injected between the lead wire 45 and an insulation coating member 45*a*, and is solidified, thereby ensuring water resistance of an electric connection portion between the heater body 42 and the lead wire 45. Further, an electric resistor of the heater body 42 is not a resistor that is self-controlled at a set temperature. Therefore, a temperature sensor 46 for detecting the temperature of the electric heater 40 is disposed on the outer peripheral surface of the electric heater 40 as shown in FIG. 2. Energization for the electric heater 40 is controlled based on the temperature detected by the temperature sensor 46.

Figure 4:
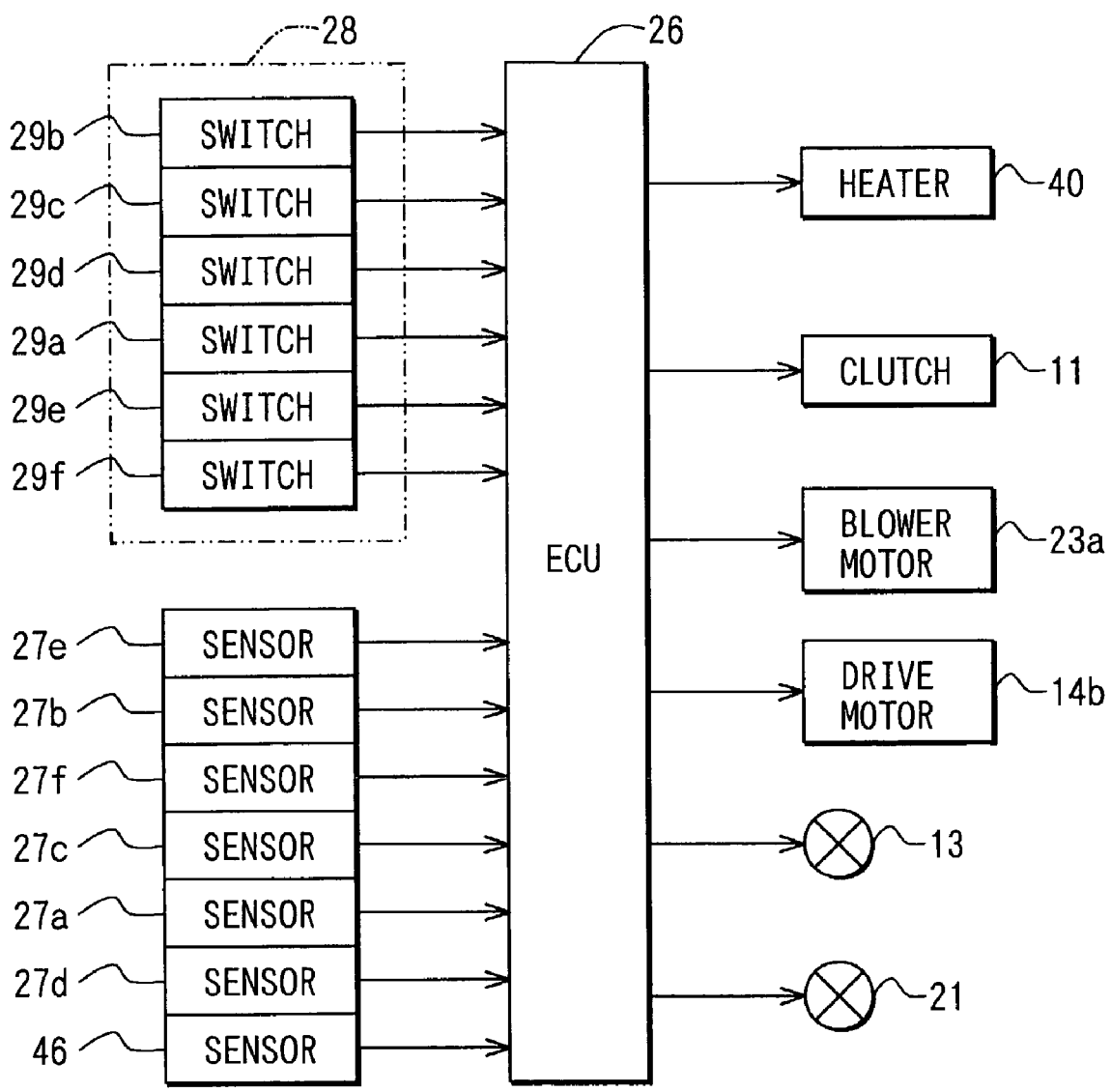
FIG. 4 is a block diagram showing electronic control in the vehicle air conditioner according to the first embodiment.

As shown in FIG. 4, detection signals are input to the ECU 26 from a sensor group including a water temperature sensor 27*a* of the vehicle engine 12, an outside air temperature sensor 27*b*, an evaporator temperature sensor 27*c*, a pressure sensor 27*d*, an inside air temperature sensor 27*e* and a sunlight sensor 27*f*. The pressure sensor 27*d* is for detecting the pressure of refrigerant discharged from the compressor 10, and the sunlight sensor 27*f* is for detecting an amount of sunlight radiated into the passenger compartment, and the evaporator temperature sensor 27*c* is for detecting an air temperature immediately blown from the evaporator 18. Further, a detection signal is input to the ECU 26 from the temperature sensor 46 of the electric heater 40.

Operation signals are input to the ECU 26 from an operational switch group provided on an air-conditioning panel 28 disposed around a dashboard in the passenger compartment. The operational switch group includes an air-conditioning switch 29*a*, a hot gas switch 29*b*, an air outlet mode switch 29*c*, a temperature setting switch 29*d*, a blower switch 29*e*, an inside-outside air switch 29*f* and the like. The air-conditioning switch 29*a* is for commanding to start and stop the operation of the compressor 10, and is also a cooling switch for setting a cooling mode. The hot gas switch 29*b* is for setting the heating mode using the hot-gas heater cycle, and is also a heating switch. The air outlet mode switch 29*c* is for switching the air outlet mode, and the temperature setting switch 29*d* is for setting an air temperature in the passenger compartment. The blower switch 29e is for commanding to turn on and turn off the blower 23 and to set the air blowing amount of the blower 23. The inside-outside air switch 29f is for commanding to switch one of the outside air mode and the inside air mode, for example.

Next, operation of the vehicle air conditioner according to the first embodiment will be described. At first, operation of the refrigerant cycle will be described. When the cooling mode is set by turning on the air-conditioning switch 29a, the cooling solenoid valve 13 is opened and the heating solenoid valve 21 is closed by the ECU 26. Then, the compressor 10 is driven by the vehicle engine 12 through the solenoid clutch 11, and high-pressure high-temperature gas refrigerant discharged from the compressor 10 flows into the condenser 14 through the opened cooling solenoid valve 13. In the condenser 14, the gas refrigerant from the compressor 10 is cooled by outside air blown by the cooling fan 14a, and is liquefied (condensed). The condensed refrigerant is separated into gas refrigerant and liquid refrigerant in the receiver 15, and only the separated liquid refrigerant is decompressed by the thermal expansion valve 16 to be in a gas-liquid two-phase refrigerant having a low temperature and low-pressure. The low-pressure refrigerant passes through the check valve 17, and flows into the evaporator 18. In the evaporator 18, the low-pressure refrigerant absorbs heat from air blown by the blower 23, and is evaporated. The cooled air from the evaporator 18 flows into the passenger compartment from the face air port 32 and the like, and the passenger compartment is cooled. The refrigerant evaporated in the evaporator 18 is sucked into the compressor 10 through the accumulator 19, and is compressed again in the compressor 10.

In winter, when the heating mode using the hot-gas heater cycle H is set by turning on the hot gas switch 29b, the cooling solenoid valve 13 is closed and the heating solenoid valve 21 is opened by the ECU 26. Therefore, high-temperature gas refrigerant (super-heated gas refrigerant), discharged from the compressor 10, flows through the opened heating solenoid valve 21, and is decompressed in the throttle 21a. Thereafter, the decompressed refrigerant from the throttle 21a flows into the evaporator 18. That is, the supper-heated gas refrigerant (hot gas) discharged from the compressor 10 bypasses the condenser 14 and the like, and is introduced directly into the evaporator 18. At this time, the check valve 17 prevents the gas refrigerant from flowing into the thermal expansion valve 16 from the hot-gas bypass passage 20. Accordingly, the refrigerant cycle is operated in the closed circuit (hot-gas heater cycle H) from the discharge port of the compressor 10 to the suction port of the compressor 10 through the heating solenoid valve 21, the throttle 21a, the evaporator 18 and the accumulator 19.

Then, the super-heated gas refrigerant, decompressed in the throttle 21a, radiates heat in the evaporator 18, so that air passing through the evaporator 18 is heated. An amount of heat, radiated from the gas refrigerant in the evaporator 18, corresponds to a compression work amount of the compressor 10. The gas refrigerant, having radiated heat in the evaporator 18, is sucked into the compressor 10 through the accumulator 19, and is compressed therein. When a water temperature TW in the hot water cycle is low, for example, at a time directly after the start of the vehicle engine 12, warming-up control is performed so that the blower 23 is operated at a low blowing amount. Hot water from the vehicle engine 12 is circulated into the heating heat exchanger 24 through the hot water valve 25, so that air heated by the evaporator 18 is further heated by the heating heat exchanger 24 in the air conditioning case 22. Accordingly, also in winter, higher-temperature warm air, heated by both of the evaporator 18 and the heating heat exchanger 24, can be blown into the passenger compartment, and heating capacity for heating the passenger compartment can be increased.

The hot-gas heater cycle H includes the accumulator 19 at the outlet side of the evaporator 18 to ensure the refrigerant amount in the hot-gas heater cycle and the amount of lubricating oil returned into the compressor 10. Since a gas-liquid boundary surface of refrigerant is formed in the accumulator 19, low-pressure gas refrigerant at the outlet of the evaporator 18 balances with liquid refrigerant in the accumulator 19 to become saturated gas refrigerant. Liquid refrigerant, stored in the accumulator 19 at the lower side, can be heated and evaporated by the electric heater 40 attached to the accumulator 19 around its outer peripheral surface at the lower side. Here, the electric heater 40 heats the liquid refrigerant in the accumulator 19, and a heat transmission rate of liquid refrigerant is larger than that of gas refrigerant. Therefore, heat generated by the electric heater 40 can be efficiently transmitted to refrigerant in the accumulator 19.

The pressure of refrigerant to be sucked into the compressor 10 is increased due to evaporation of liquid refrigerant in the accumulator 19, and density of refrigerant to be sucked into the compressor 10 is increased. Therefore, a mass flow amount of refrigerant discharged from the compressor 10 is increased, and the pressure of refrigerant discharged from the compressor 10 is increased. Thus, a compression-work amount of the compressor 10 is increased. As a result, a radiation amount of refrigerant in the evaporator 18 can be effectively increased, and heating performance for heating air can be effectively improved in the hot-gas heating mode.

Figure 5:
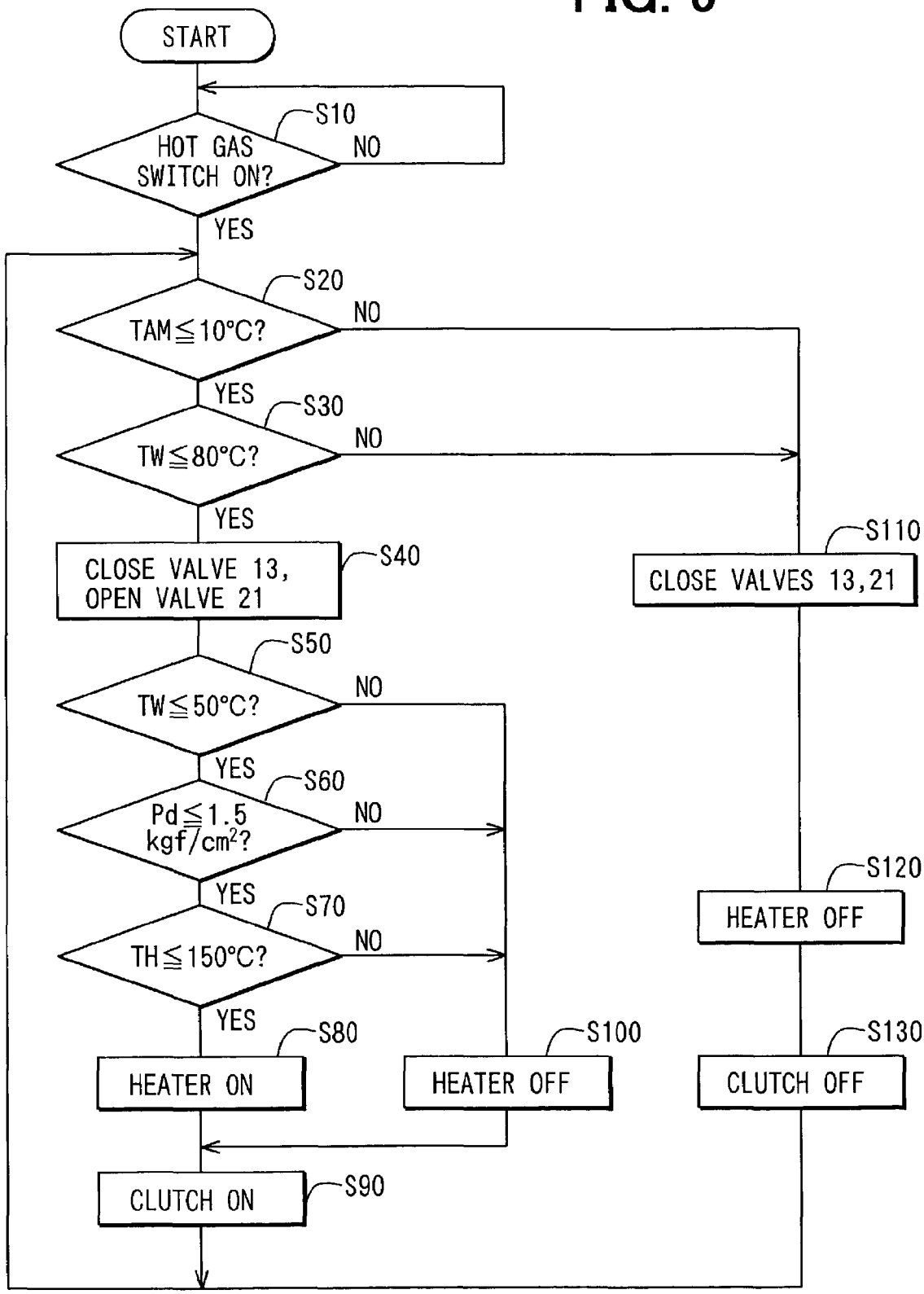
FIG. 5 is a flow diagram showing control process in a hot-gas heating mode of the vehicle air conditioner according to the first embodiment.

Next, heating-capacity control in the heating mode using the hot-gas heater cycle H according to the first embodiment will be described with reference to FIG. 5. In FIG. 5, a control routine is started when operation of the vehicle engine 12 is started, that is, when an ignition switch is turned on. At step S10, it is determined whether or not the hot gas switch 29b on the air-conditioning operation panel 28 is turned on. When the hot gas switch 29b is turned on, it is determined at step S20 whether or not an outside air temperature TAM is equal to or lower than a predetermined air temperature (e.g., 10° C.). The determination at step S20 is performed to determine whether or not the outside air temperature TAM is in a low outside-temperature area where the hot-gas heating mode (auxiliary heating operation) is required. When the outside air temperature TAM is equal to or lower than the first predetermined air temperature, it is determined at step S30 whether or not the engine water temperature TW is equal to or lower than a first predetermined water temperature (e.g., 80° C.). The determination at step S30 is performed to determine whether or not the engine water temperature TW is in a low temperature area where the hot-gas heating mode is required. When the engine water temperature TW is equal to or lower than the first predetermined water temperature, the hot-gas heating mode is set at step S40. In the hot-gas heating mode, the cooling solenoid valve 13 is closed, and the heating solenoid valve 21 is opened.

At step S50, it is determined whether or not the engine water temperature TW is equal to or lower than a second predetermined water temperature (e.g., 50° C.). The second predetermined water temperature is lower than the first predetermined water temperature by a predetermined water temperature. The determination at step S50 is performed to determine whether or not the engine water temperature TW is in a low temperature area where the electric heater 40 is required to be operated. When the engine water temperature TW is equal to or lower than the second predetermined water temperature, it is determined at step S60 whether or not discharge pressure Pd of the compressor 10 is equal to or lower than a predetermined pressure (e.g., 1.5 kgf/cm$^2$). When the discharge pressure Pd is equal to or lower than the predetermined pressure, it is determined at step S70 whether or not a surface temperature TH of the electric heater 40 is equal to or lower than a predetermined heater temperature (e.g., 150° C.). Here, the surface temperature TH is detected by the temperature sensor 46. When the surface temperature TH of the electric heater 40 is equal to or lower than the predetermined heater temperature, the electric heater 40 is energized at step S80, and the compressor 10 is driven by energizing the solenoid clutch 11 at step S90. Thus, refrigerant discharged from the compressor 10 can be circulated in the hot-gas heater cycle H, and liquid refrigerant stored in the accumulator 19 at the lower portion can be heated and evaporated by the electric heater 40.

When the determination at steps S50–S70 is NO, the electric heater 40 is turned off at step S100. In the present example, the surface temperature TH of the electric heater 40 is controlled around 150° C. by the determination at step S70. When it is determined at step S20 that the outside air temperature TAM is higher than the predetermined air temperature, or when it is determined at step S30 that the engine water temperature TW is higher than the first predetermined water temperature, it can be determined that the hot-gas heating mode is not required in the present environmental condition. Therefore, the cooling solenoid valve 13 and the heating solenoid valve 21 are closed at step S110. Further, the electric heater 40 is turned off at step S120, and the operation of the compressor 10 is stopped by de-energizing the solenoid clutch 11 at step S130. Thus, even when the hot gas switch 29b is turned on, when the hot-gas heating mode is not required, the electric heater 40 can be automatically de-energized, and the operation of the compressor 10 can be automatically stopped.

Figure 6:
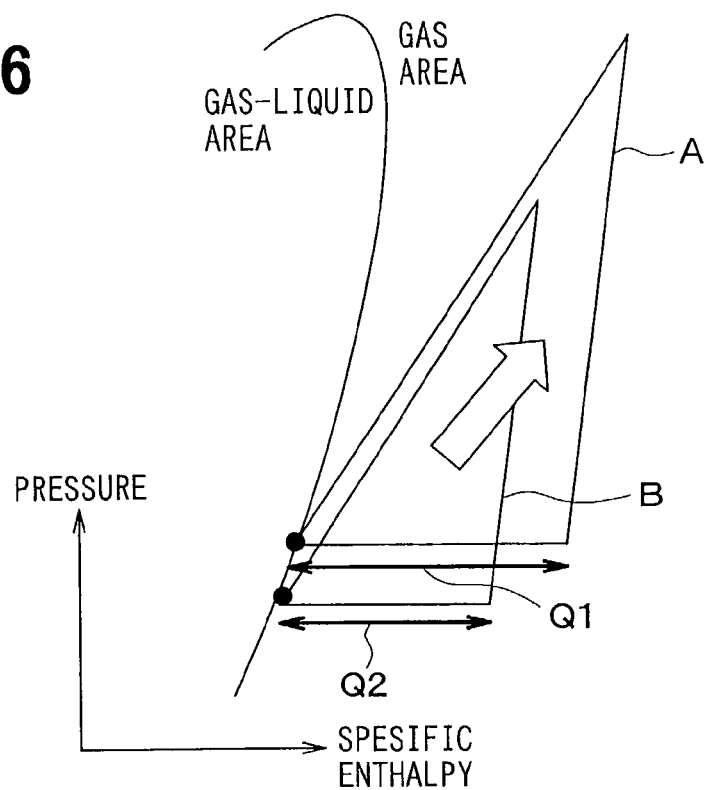
FIG. 6 is a Mollier diagram showing control operation of a hot-gas heater cycle in a hot-gas heating mode of the vehicle air conditioner according to the first embodiment.

Next, operational advantage of the vehicle air conditioner according to the first embodiment will be specifically described. In FIG. 6, the Mollier diagram A shows an operation state of refrigerant in the hot-gas heater cycle H when the surface temperature TH of the electric heater 40 is controlled around 150° C. by energizing the electric heater 40. On the other hand, the Mollier diagram B shows an operation state of refrigerant in the hot-gas heater cycle H when the electric heater 40 is de-energized. When the electric heater 40 is energized, the suction refrigerant pressure of the compressor 10 is increased due to the evaporation of refrigerant in the accumulator 19, so that the compression work amount of the compressor 10 can be increased. Therefore, the radiation amount of the evaporator 18 can be increased by the increased compression amount of the compressor 10 in addition to the heat transmission amount transmitted from the electric heater 40 directly to the refrigerant. Thus, in FIG. 6, the radiation amount of refrigerant in the evaporator 18 can be increased by energizing the electric heater 40 from a radiation amount Q2 to a radiation amount Q1. The radiation amount Q1 is generated from the evaporator 18 when the electric heater 40 is energized as shown in the Mollier diagram A in FIG. 6, and the radiation amount Q2 is generated from the evaporator 18 when the electric heater 40 is de-energized as shown in the Mollier diagram B.

The compression work amount of the compressor 10 is increased due to the refrigerant evaporation in the accumulator 19 using heat from the electric heater 40. Therefore, a compressor driving load of the vehicle engine 12 is increased, and the engine water temperature TW is facilitated to be increased, thereby also improving heating performance of the heating heat exchanger 24. Further, when the electric heater 40 is energized, a power generation load of a generator (alternator) is increased, and a generator driving load of the vehicle engine 12 is increased, so that the engine water temperature TW is further increased. Accordingly, the radiation amount from the evaporator 18 and the radiation amount from the heating heat exchanger 24 are increased, and heating performance in the hot-gas heating mode can be efficiently improved. Thus, even in a low outside air temperature, the passenger compartment can be rapidly heated.

Figure 7:
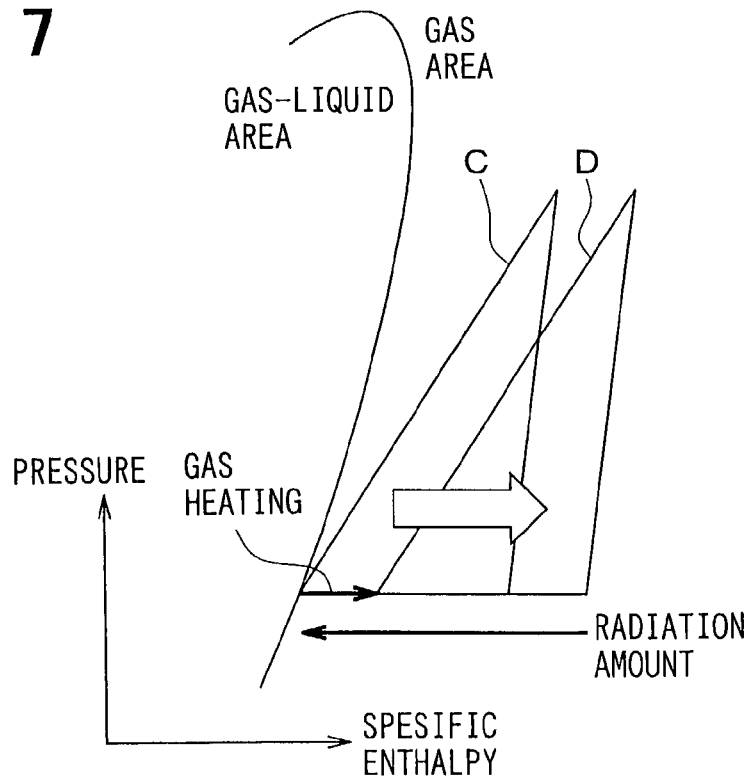
FIG. 7 is a Mollier diagram showing control operation of a hot-gas heater cycle in a hot-gas heating mode of a first comparison example.

FIG. 7 is a Mollier diagram in a first comparison example where a low-pressure refrigerant pipe (suction refrigerant pipe) between the outlet of the accumulator 19 and the suction side of the compressor 10 is heated by using an electrical heater. In FIG. 7, the Mollier diagram C shows a state where the electrical heater is not turned on, and the Mollier diagram D shows a state where the electrical heater is turned on. As shown in FIG. 7, when the Mollier diagram is moved from the C state to the D state, the super-heating degree of gas refrigerant sucked into the compressor is increased, and thereby increasing the radiation amount of the evaporator 18. However, in this case, because only the gas refrigerant sucked into the compressor 10 is heated by the electrical heater, only the super-heating degree of refrigerant sucked into the compressor 10 is increased, but the suction pressure of refrigerant sucked into the compressor 10 is almost not increased because the liquid refrigerant is not evaporated in this case. Accordingly, the radiation amount due to an increase of the suction refrigerant pressure of the compressor 10 cannot be obtained.

Figure 8:
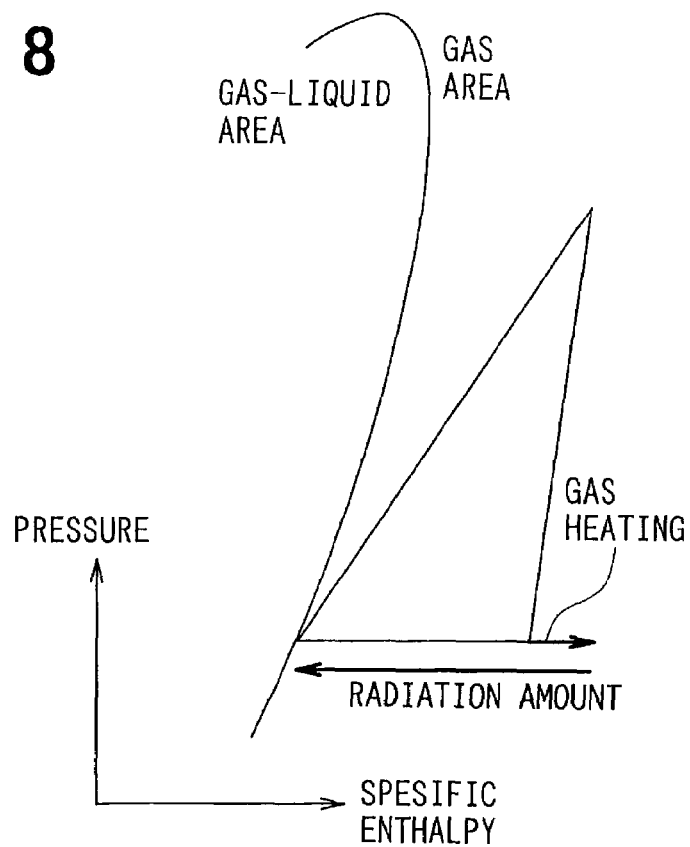
FIG. 8 is a Mollier diagram showing control operation of a hot-gas heater cycle in a hot-gas heating mode of a second comparison example.

On the other hand, FIG. 8 is a Mollier diagram in a second comparison example where a low-pressure refrigerant pipe between the throttle 21a (heating decompression device) and the inlet of the evaporator 18 is heated by using an electrical heater. In FIG. 8, because the super-heated gas refrigerant after being decompressed in the throttle 21a is heated by the electrical heater, the super-heating degree of gas refrigerant is mainly increased. Thus, similarly to the case in FIG. 7, the heat radiation amount due to the increase of the compression work amount cannot be largely improved. In addition, in the second compression example shown in FIG. 8, because the super-heated gas refrigerant after being decompressed in the throttle 21a is further heated by the electrical heater, the gas refrigerant after being heated in the electrical heater becomes greatly higher than the outside air temperature, the heat loss to the outside air is increased.

Figure 9:
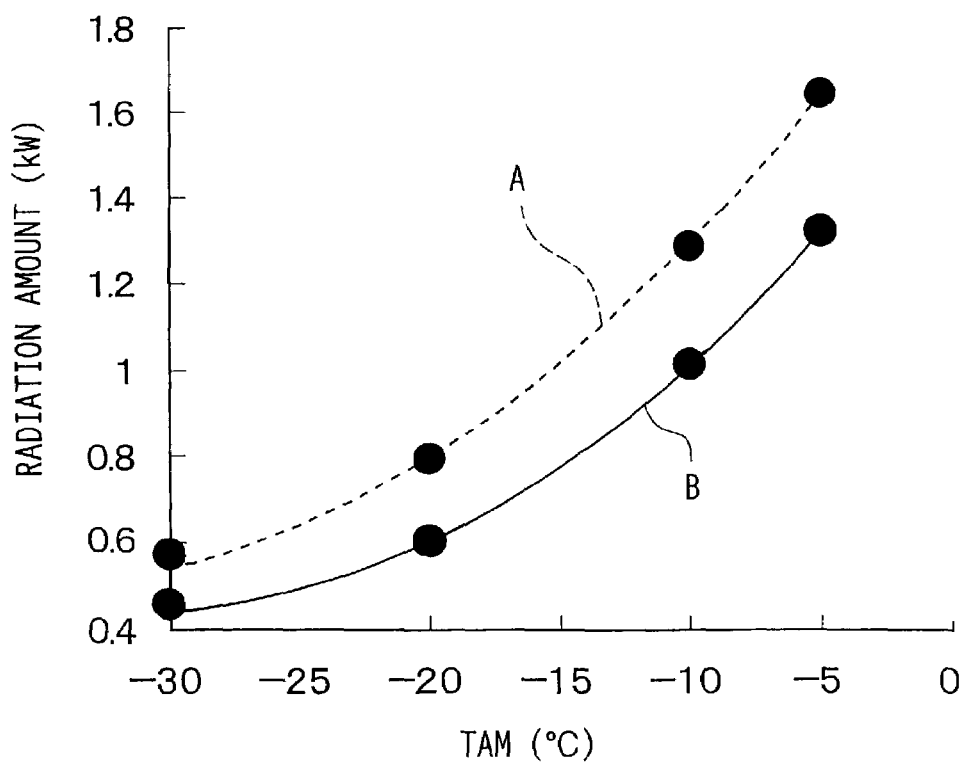
FIG. 9 is a graph for explaining a radiation amount increase in an evaporator in the hot-gas heating mode of the vehicle air conditioner according to the first embodiment.

Next, heating-performance improvement of the vehicle air conditioner according to the first embodiment will be specifically described based on test data with reference to FIG. 9. In FIG. 9, the electric heater 40 having a heating capacity of 120 W is attached to the accumulator 19 on its outer peripheral surface at its lower portion. Further, an amount of air blown into the passenger compartment is set at 300 m$^3$/h, and a rotational speed of the compressor 10 is set at 2000 rpm. Then, liquid refrigerant in the accumulator 19 is heated by controlling the surface temperature TH of the electric heater 40 at 150° C. In this condition, the radiation amount of the evaporator 18 is increased from the graph B to the graph A, as shown in FIG. 9. In the heating mode, when the heating operation of liquid refrigerant in the accumulator 19 is performed in the hot-gas heater cycle H, the radiation amount of the evaporator 18 can be increased by 100–340 W as compared with a case where the heating operation of liquid refrigerant in the accumulator 19 is not provided, in an outside air temperature range of −30–0° C. In the outside temperature range except for an extreme low outside air temperature lower than −25° C., when the liquid refrigerant in the accumulator 19 is heated and evaporated, the compression work amount of the compressor 10 is increased, and the radiation amount of the evaporator 18 is increased at least by the heating amount (120 W) of the electric heater 40, thereby efficiently increasing the radiation amount of the evaporator 18.

Here, when the electric heater 40 is energized, the compressor driving load and the generator driving load of the vehicle engine 12 are increased, and the engine water temperature TW is increased. Therefore, heating performance of the heating heat exchanger 24 is also improved. The Bench test result shown in FIG. 9 does not consider this heating-performance improvement of the heating heat exchanger 24. According to the Bench test, this heating-performance improvement of the heating heat exchanger 24 can be estimated as follows in an actual vehicle. That is, the radiation amount of the heating heat exchanger 24 is increased due to this heating-performance improvement by approximate 360 W corresponding to three times of heating-amount of the electric heater 40 in an outside air temperature of −20° C.

Figure 10:
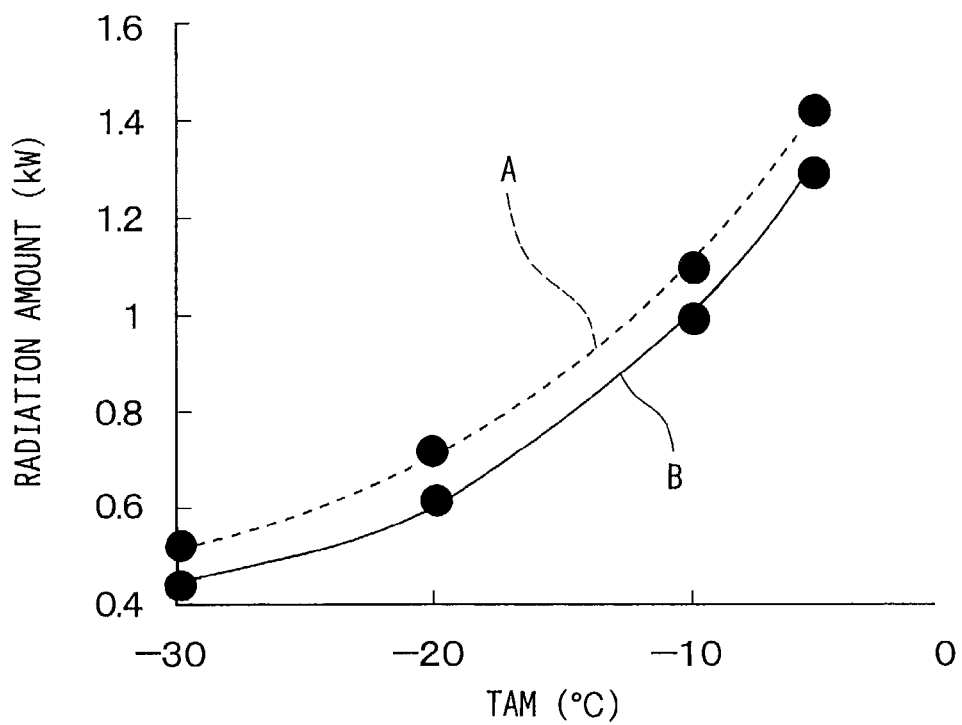
FIG. 10 is a graph showing a radiation amount increase of hot gas refrigerant in an evaporator in the hot-gas heating mode of the first comparison example.

FIG. 10 shows the radiation amount increase in the evaporator of the first comparison example. In the same condition as FIG. 9, the radiation amount from the evaporator is increased only by 80–130 W in the outside air temperature of −30° C.–0° C.

Figure 11:
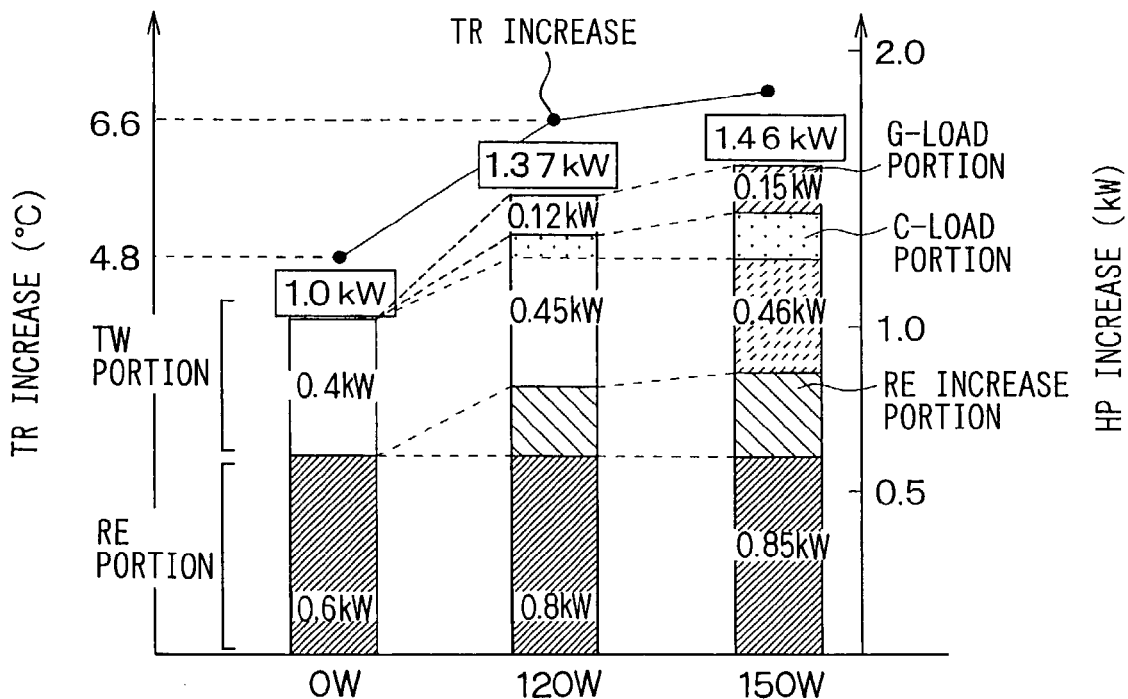
FIG. 11 is a graph showing a heating-performance increase (heating-capacity increase) in the hot-gas heating mode of the vehicle air conditioner according to the first embodiment.

FIG. 11 shows the heating-performance increase (HP increase) of the vehicle air conditioner according to the first embodiment in the outside air temperature TAM of −20° C., and the heating-performance increase is shown for every factor. In FIG. 11, the left ordinate shows the temperature increase of the passenger compartment (TR increase) due to the hot-gas heating mode, and the right ordinate shows the heating performance increase due to the hot-gas heating mode. As shown in FIG. 11, the bar graph at the left side in the right-left direction shows the heating-performance increase when only the hot-gas heater cycle H is operated, that is, when the heating amount due to the electrical heater 40 is set at 0 W. The bar graph at the left side includes the HP increase portion due to a water-temperature increase factor (TW portion) and the HP increase portion due to an evaporator-radiation amount factor (RE portion). Further, the bar graph at the center shows the heating-performance increase when the heating amount of the electric heater 40 is set at 120 W. As seen from these bar graphs, when the heating amount of 120 W is added, the heating performance is increased by 0.37 KW, and an air temperature in the passenger compartment of a small-sized vehicle is increased by about 2° C., as compared with the case where the electric heater 40 is turned off. Specifically, the water temperature (TW portion) is increased by a generator-driving load portion (G-load portion) and a compressor-driving load portion (C-load portion), and the evaporator-radiation amount is increased by a RE increase portion. Further, the bar graph at the right side shows the heating-performance increase when the heating amount of the electric heater 40 is increased to 150 W.

(Second Embodiment)

Figure 12:
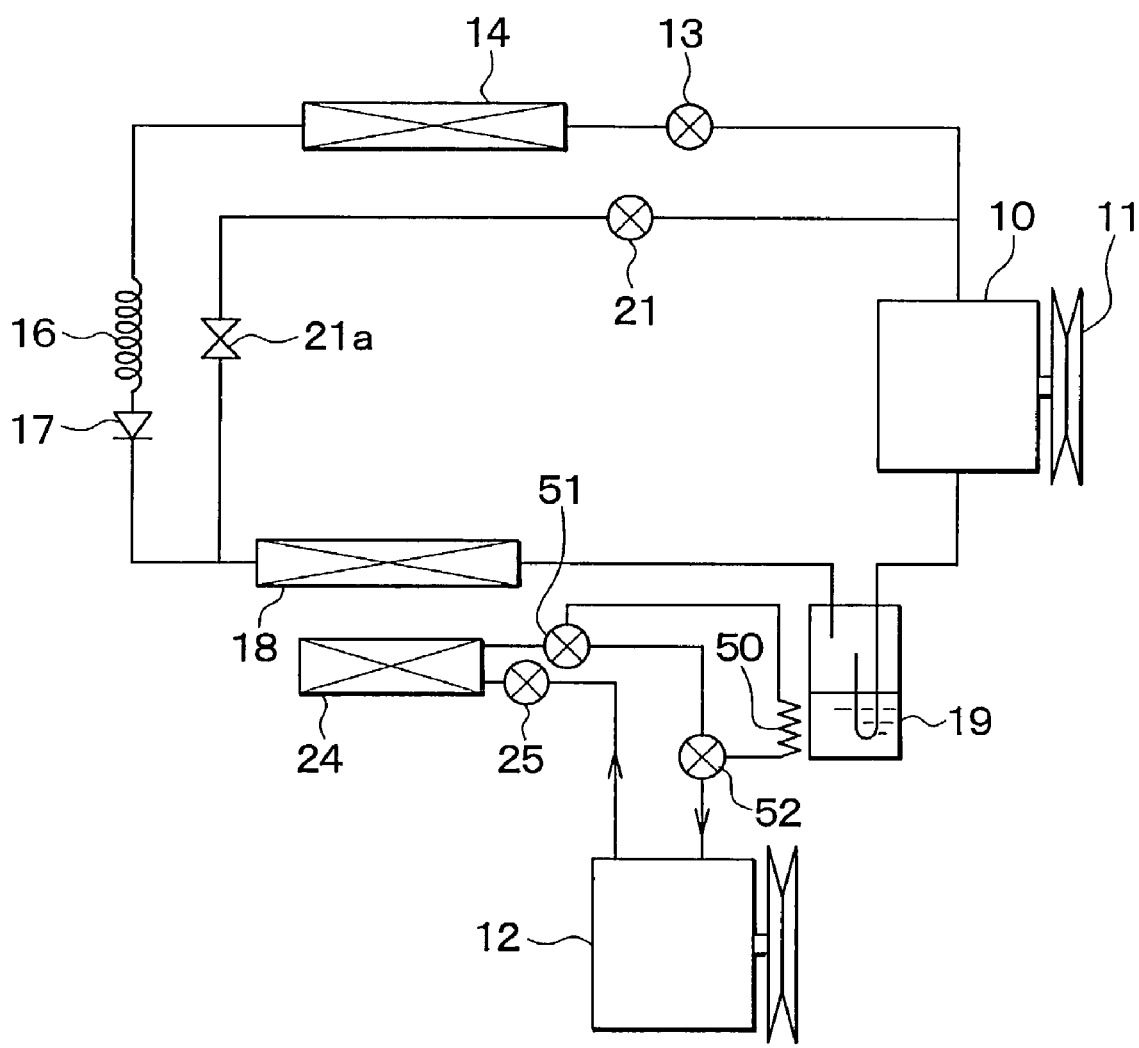
FIG. 12 is a schematic diagram showing an entire refrigerant system of a vehicle air conditioner according to a second embodiment of the present invention.

In the above-described first embodiment, the electric heater 40 is used as a heating device for heating the liquid refrigerant in the accumulator 19. In the second embodiment shown in FIG. 12, a hot water pipe 50, where engine-cooling water is circulated, is provided on the accumulator 19 at its lower portion in place of the electric heater 40. That is, liquid refrigerant in the accumulator 19 is heated by the hot water in the hot water pipe 50 as a heat source.

Specifically, three-way solenoid valves 51, 52 are added to the hot water circuit of the heating heat exchanger 24, and the hot water pipe 50 is connected to the solenoid valves 51, 52. Normally, the hot water pipe 50 is interrupted by the solenoid valves 51, 52 from the hot water circuit of the heating heat exchanger 24. If the determinations at steps S50, S60 in FIG. 5 are YES, that is, when the engine water temperature TW is low and the discharge pressure of refrigerant from the compressor 10 is low, the hot water pipe 50 is opened in the hot water circuit of the heating heat exchanger 24 by switching the solenoid valves 51, 52. Thus, liquid refrigerant in the accumulator 19 can be heated by the hot water in the hot water pipe 50 as a heating source. Further, in the refrigerant cycle according to the second embodiment, the cooling decompression device 16 is constructed by a fixed throttle such as a capillary tube, and the receiver 15 shown in FIG. 1 is eliminated. In the second embodiment, the other parts are similar to those of the above-described first embodiment, and detail description thereof is omitted. Accordingly, even in the second embodiment, the heating performance can be effectively increased in the hot-water heating mode.

Although the present invention has been fully described in connection with the preferred embodiments thereof with reference to the accompanying drawings, it is to be noted that various changes and modifications will become apparent to those skilled in the art.

Figure 13:
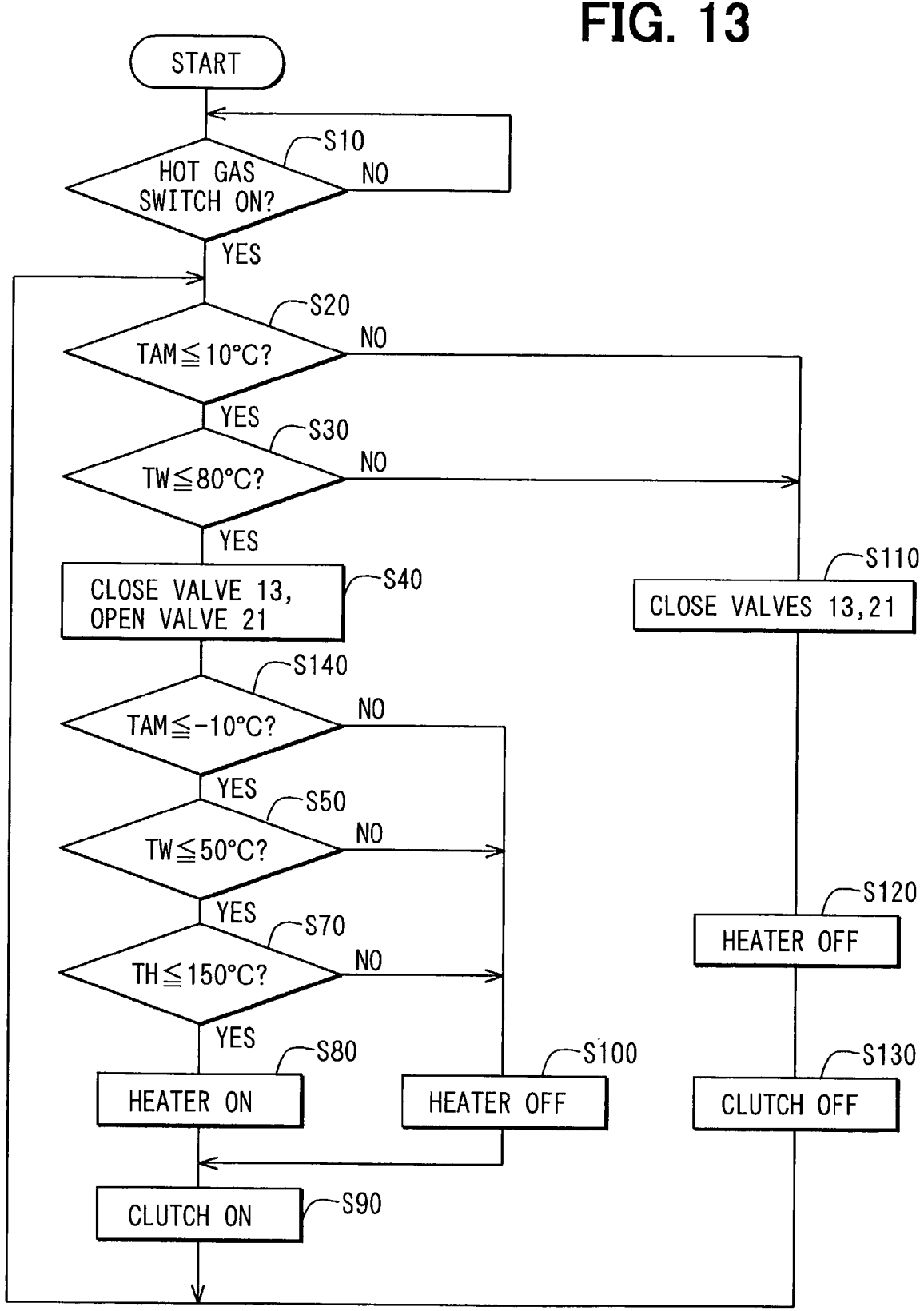
FIG. 13 is a flow diagram showing control process in the hot-gas heating mode of a vehicle air conditioner according to a modification of the first embodiment.

For example, in the above-described first embodiment of the present invention, the operation of the electrical heater 40 is controlled as shown in FIG. 5. However, the control steps S50 and S60 in FIG. 5 can be changed as shown in FIGS. 13–17. That is, the energization control for the electric heater 40 can be changed variously without being limited to the control shown in FIG. 5. In FIG. 5, it is determined at step S60 whether or not the discharge pressure Pd of the compressor 10 is equal to or lower than the predetermined pressure. In the modification shown in FIG. 13, step S140 is provided, and step S60 in FIG. 5 is omitted. A second predetermined air temperature (e.g., −10° C.) is set lower than the first predetermined air temperature (e.g., 10° C.), and it is determined at step S140 whether or not the outside air temperature TAM is equal to or lower than the second predetermined air temperature. When the determination at step S140 is NO, the electric heater 40 is turned off. That is, in the modification shown in FIG. 13, at least when the outside air temperature is equal to or lower than −10° C. and the engine water temperature TW is equal to or lower than 50° C., the electric heater 40 is energized. The other control steps shown in FIG. 13 are identical to those in FIG. 5.

Figure 14:
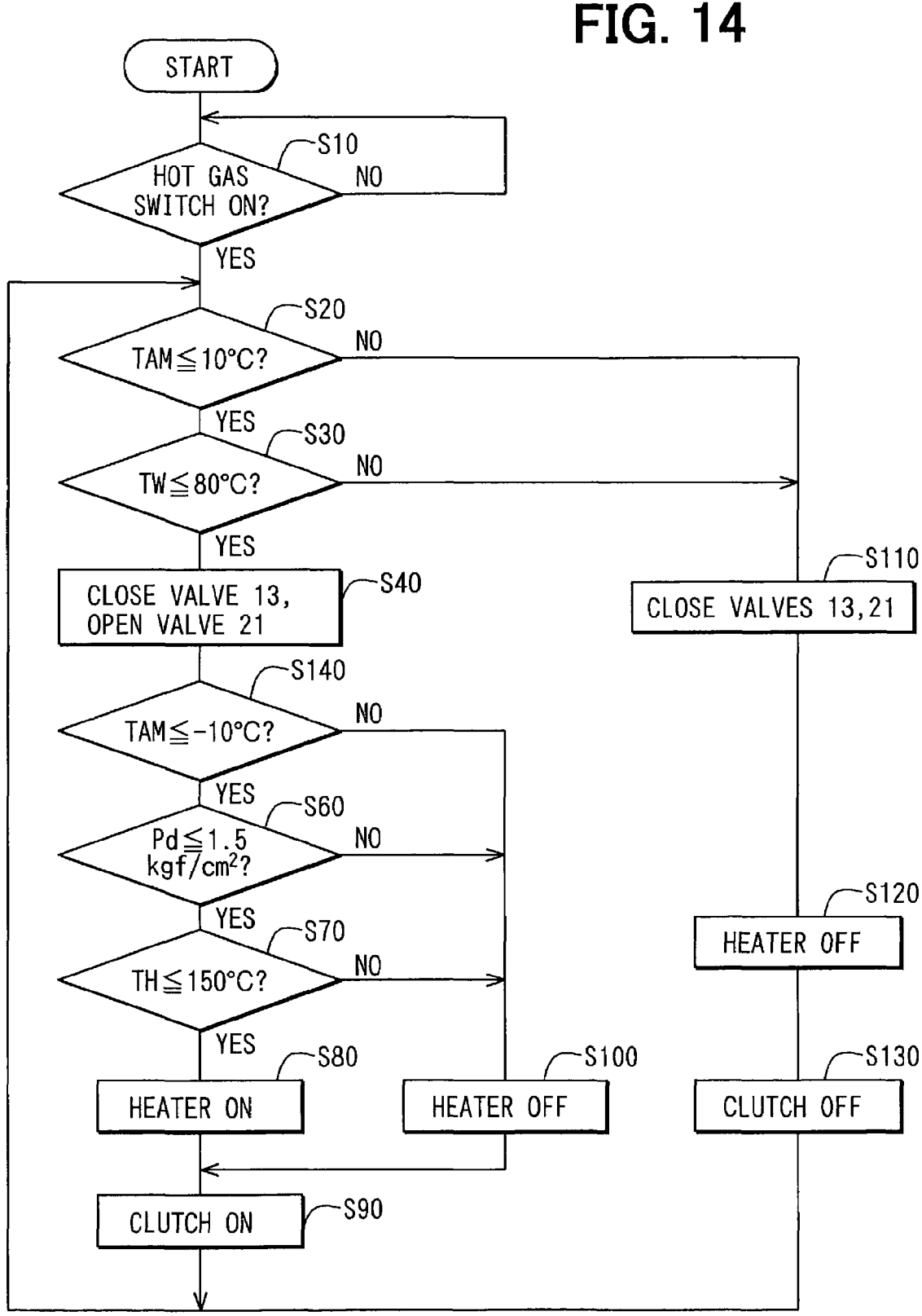
FIG. 14 is a flow diagram showing control process in the hot-gas heating mode of a vehicle air conditioner according to an another modification of the first embodiment.

In the modification shown in FIG. 14, step S50 shown in FIG. 5 is omitted, and step S140 described in FIG. 13 is added. Therefore, in the modification shown in FIG. 14, when the outside air temperature TAM is equal to or lower than the second predetermined air temperature (e.g., −10° C.) and the discharge pressure Pd is equal to or lower than 1.5 kgf/cm², the electric heater 40 is turned on. The other control steps shown in FIG. 14 are identical to those in FIG. 5.

Figure 15:
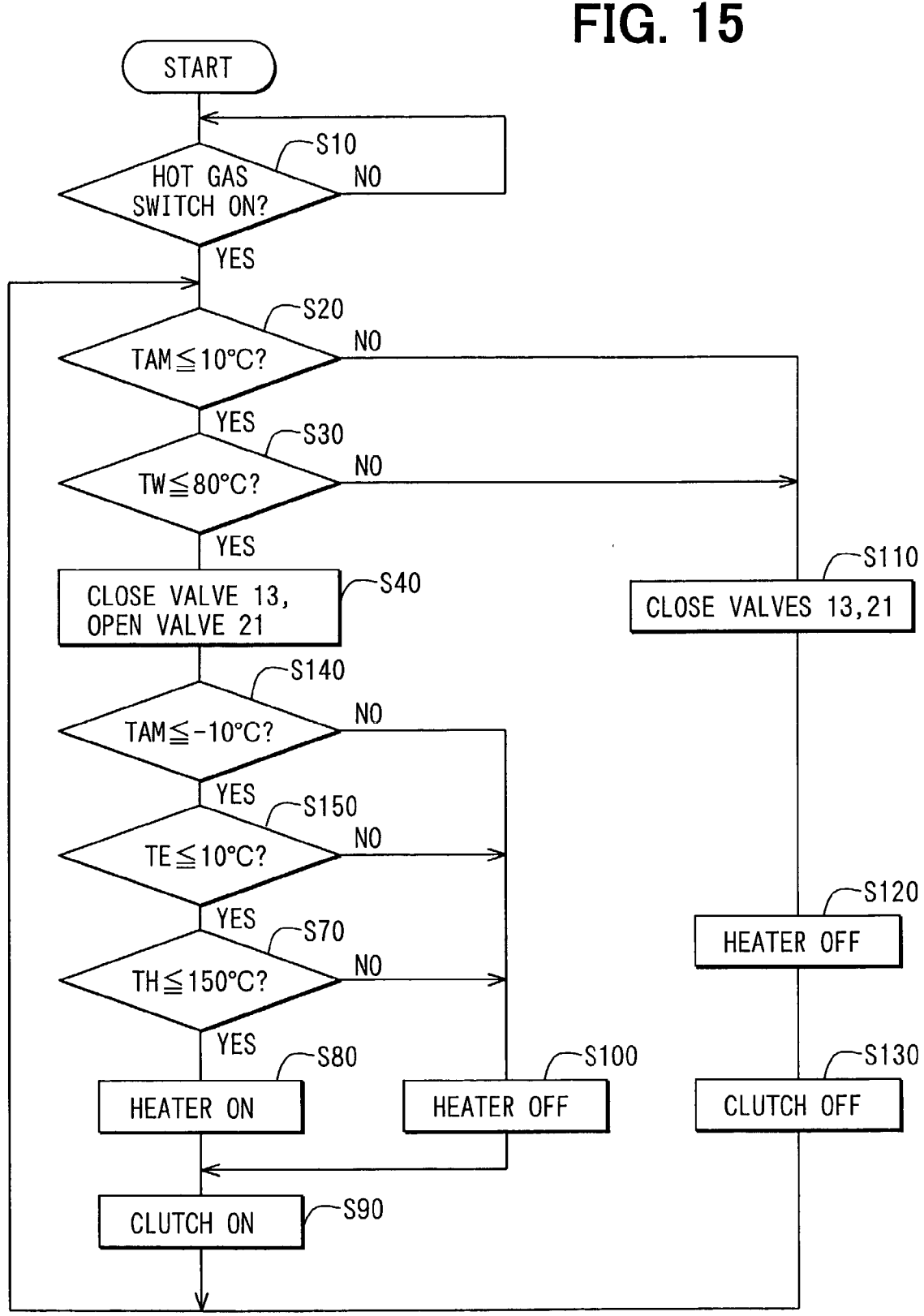
FIG. 15 is a flow diagram showing control process in the hot-gas heating mode of a vehicle air conditioner according to a further another modification of the first embodiment.

In the modification shown in FIG. 15, steps S140 and S150 are provided in place of steps S50, S60 shown in FIG. 5. When the outside air temperature TAM is equal to or lower than the second predetermined air temperature (e.g., −10° C.) at step S140, it is determined whether or not the evaporator air temperature TE detected by the evaporator temperature sensor 27c is equal to or lower than a predetermined temperature (e.g., 10° C.), at step S150. That is, it is determined whether or not the radiation performance of the evaporator 18 is low at step S150. Therefore, in the modification shown in FIG. 15, at least when the outside air temperature TAM is equal to or lower than −10° C. and the evaporator air temperature TE is equal to or lower than 10° C., the electric heater 40 is turned on. The other control steps shown in FIG. 15 are identical to those in FIG. 5.

Figure 16:
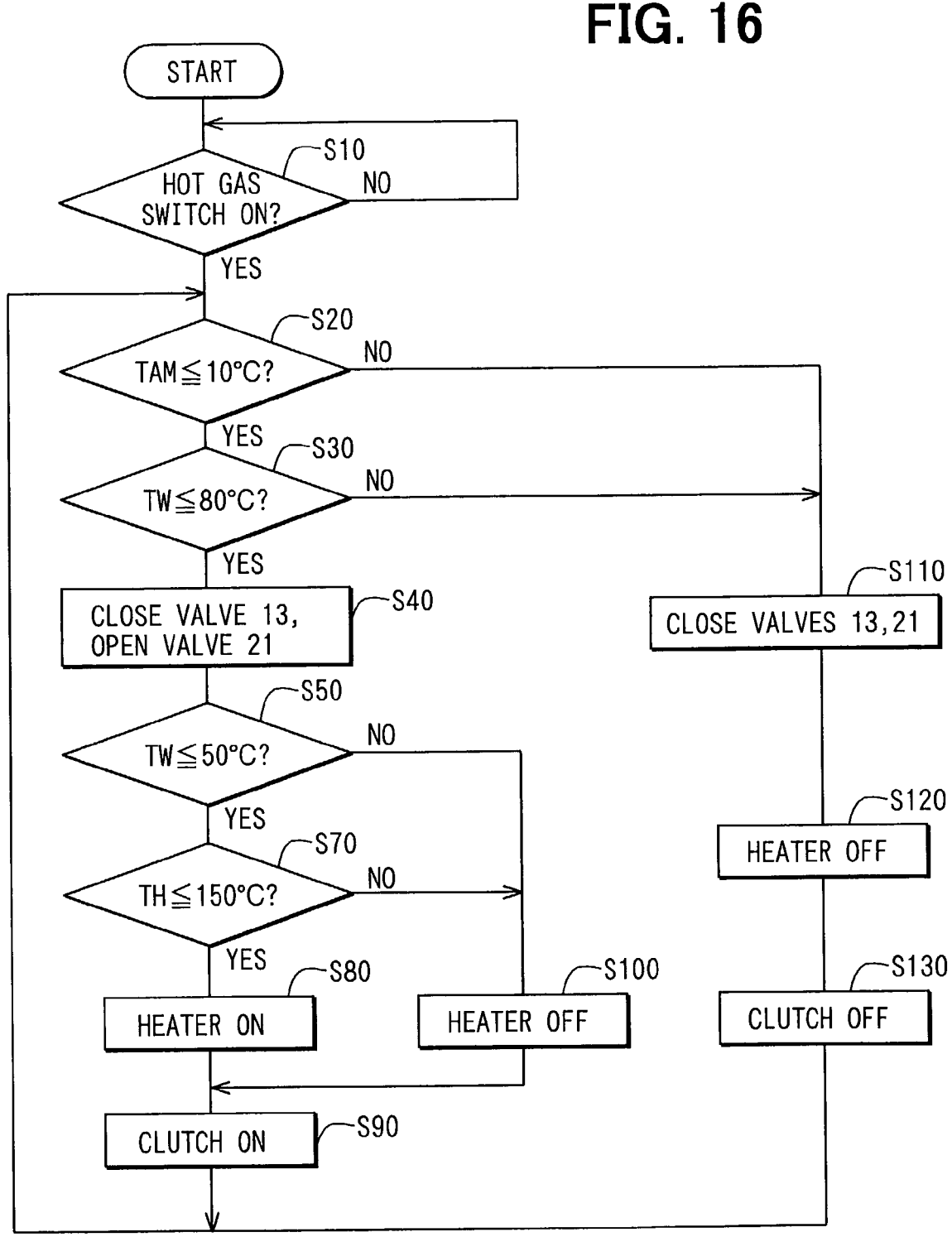
FIG. 16 is a flow diagram showing control process in the hot-gas heating mode of a vehicle air conditioner according to a further another modification of the first embodiment.

In the modification shown in FIG. 16, step S60 shown in FIG. 5 is eliminated. When the engine water temperature TW is equal to or lower than 50° C., and when the heater surface temperature TH of the electrical heater 40 is lower than the predetermined heater temperature, the electric heater 40 is energized. The other control steps shown in FIG. 16 are identical to those in FIG. 5.

Figure 17:
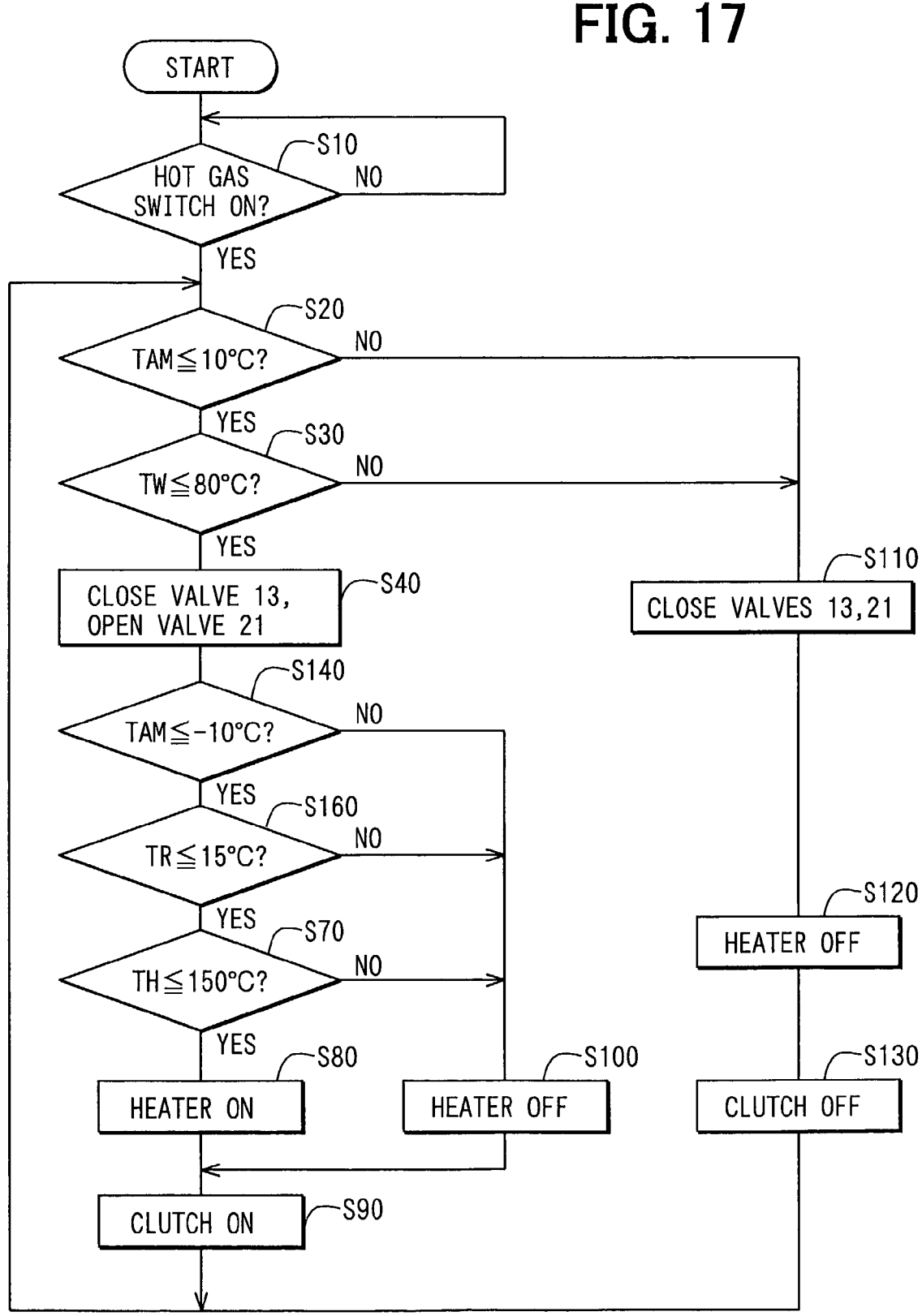
FIG. 17 is a flow diagram showing control process in the hot-gas heating mode of a vehicle air conditioner according to a further another modification of the first embodiment.

In the modification shown in FIG. 17, steps S140 and S160 are provided in place of steps S50 and S60 in FIG. 5. In the modification shown in FIG. 17, when the outside air temperature TAM is equal to or lower than −10° C., it is determined whether or not the inside air temperature TR of the passenger compartment detected by the inside temperature sensor 27e is equal to or lower than a predetermined temperature (e.g., 15° C.) at step S160. That is, at step S160, it is determined whether or not the inside air temperature TR is low, more specifically, whether or not the heating operation is deficient in the passenger compartment. In the modification shown in FIG. 17, at least when the outside air temperature TAM is equal to or lower than −10° C. and the inside air temperature TR is equal to or lower than 15° C., the electric heater 40 is turned on. The other control steps shown in FIG. 17 are identical to those in FIG. 5.

In the above-described first embodiment, the electric resistor of the electric heater 40 is not the self-controlled resistor in which the temperature is self-controlled at a set temperature. Therefore, the surface temperature TH of the electric heater 40 is detected by the temperature sensor 46, and the energization for the electric heater 40 is interrupted based on the detected surface temperature TH, thereby controlling the surface temperature TH at a predetermined temperature (e.g., 150° C.). However, when the electric heater 40 is constructed by an electric heater (positive-temperature-coefficient heater, that is, PTC heater) having a positive temperature coefficient, the temperature sensor 46 is not required because the PTC heater is self-controlled. Accordingly, step S70 in FIG. 5 and FIGS. 13–17 is not required. Here, the PTC heater has a resistance temperature characteristic where the resistance value is rapidly increased at a predetermined temperature as its temperature is increased.

Further, the electric heater 40 can be provided on the accumulator 19 at its outer bottom surface in addition to its outer peripheral surface, or can be provided only at its outer bottom surface. That is, the electric heater 40 can be disposed to heat the outer peripheral surface or/and the outer bottom surface of the accumulator 19, at a position where the liquid refrigerant is stored. Similarly to the electric heater 40, the arrangement position of the hot water pipe 52 shown in FIG. 12 on the accumulator 19 can be changed.

Such changes and modifications are to be understood as being within the scope of the present invention as defined by the appended claims.

What is claimed is:
1. An air conditioner for a vehicle, comprising:
a heating heat exchanger which heats air to be blown into a compartment of the vehicle using hot water in a hot water system mounted to the vehicle;
a refrigerant cycle which is provided with a compressor for compressing refrigerant, an exterior heat exchanger for cooling refrigerant discharged from the compressor, a decompression unit which decompresses refrigerant, an interior heat exchanger for performing heat exchange with air, and an accumulator for separating refrigerant into gas refrigerant and liquid refrigerant and for storing the separated liquid refrigerant therein;
a bypass passage through which the refrigerant from the compressor is introduced into the interior heat exchanger while bypassing the exterior heat exchanger in a hot-gas heating mode for heating the compartment;
a switching valve which switches one of the hot-gas heating mode, and a cooling mode for cooling the compartment in which refrigerant flows through the compressor, the exterior heat exchanger, the decompression unit and the interior heat exchanger;
an electrical heater, attached to an outer side of the accumulator, for heating the accumulator;
a control unit which controls the switching valve and the electrical heater,
wherein the control unit includes:
a switch which indicates that the hot-gas heating mode is requested;
a first sensor which detects a condition indicating a heating load, including at least one of an air temperature outside the compartment and a water temperature of the hot water system;
a second sensor, which is attached to the electrical heater, and senses a temperature of the electrical heater and a refrigerant temperature inside the accumulator;
first means for switching the switching valve to set a mode other than the hot-gas heating mode, turn off the electrical heater and stop the compressor, when the hot-gas heating mode is requested by the switch and when the detected temperature of the first sensor is higher than a first set temperature;
second means for switching the switching valve to set the hot-gas heating mode, turn off the electrical heater and operate the compressor when the hot-gas heating mode is requested by the switch and when the detected temperature of the first sensor is lower than the first set temperature and is higher than a second set temperature;
third means for switching the switching valve to set the hot-gas heating mode, turn off the electrical heater and operate the compressor when the hot-gas heating mode is requested by the switch, when the detected temperature of the first sensor is lower than the first set temperature and is lower than the second set temperature, and the detected temperature of the second sensor is higher than a predetermined temperature; and
fourth means for switching the switching valve to set the hot-gas heating mode, turn on the electrical heater and operate the compressor when the hot-gas heating mode is requested by the switch, when the detected temperature of the first sensor is lower than the first set temperature and is lower than the second set temperature, and the detected temperature of the second sensor is lower than the predetermined temperature.

2. The air conditioner according to claim 1, wherein the control unit further includes
- a third sensor which detects a condition indicating a heating capacity, including at least one of a discharge refrigerant pressure of the compressor and an air temperature blown from the interior heat exchanger, and
- fifth means for switching the switching valve to set the hot-gas heating mode, turn off the electrical heater and operate the compressor when the hot-gas heating mode is requested by the switch, when the detected temperature of the first sensor is lower than the first set temperature and is lower than the second set temperature, and when the detected value of the third sensor is higher than a predetermined value;
- wherein the third means is constructed to have sixth means for switching the switching valve to set the hot-gas heating mode, turn off the electrical heater and operate the compressor when the hot-gas heating mode is requested by the switch, when the detected temperature of the first sensor is lower than the first set temperature and is lower than the second set temperature, when the detected temperature of the second sensor is higher than the predetermined temperature, and when the detected value of the third sensor is lower than the predetermined value; and
- wherein the fourth means is constructed to have seventh means for switching the switching valve to set the hot-gas heating mode, turn on the electrical heater and operate the compressor when the hot-gas heating mode is requested by the switch, when the detected temperature of the first sensor is lower than the first set temperature and is lower than the second set temperature, the detected temperature of the second sensor is lower than the predetermined temperature, and when the detected value of the third sensor is lower than a predetermined value.

3. The air conditioner according to claim 1, wherein:

the electrical heater includes a heater body having a thin plate, and a film member covering the heater body; and the heater body has an electrical resistance material.

4. The air conditioner according to claim 1, wherein:

the accumulator includes a tank body having a cylindrical shape in which the separated liquid refrigerant is stored; and the electrical heater is cylindrically bent and is attached to an outer peripheral surface of the tank body at a lower position.

* * * * *